United States Patent
Monaghan

[11] 3,791,100
[45] Feb. 12, 1974

[54] BUNDLING MACHINE AND PROCESS
[75] Inventor: Alfred C. Monaghan, Warren, N.J.
[73] Assignee: Weldotron Corporation, Piscataway, N.J.
[22] Filed: Feb. 4, 1971
[21] Appl. No.: 112,616

[52] U.S. Cl............................ 53/74, 53/210, 53/389
[51] Int. Cl.... B65b 11/12, B65b 41/12, B65b 57/12
[58] Field of Search.......... 53/33, 74, 209, 210, 389

[56] References Cited
UNITED STATES PATENTS
3,276,184 10/1966 Holt.................................. 53/210 X
3,540,187 11/1970 Monaghan........................ 53/210 X

*Primary Examiner*—James L. Jones, Jr.
*Assistant Examiner*—Neil Abrams
*Attorney, Agent, or Firm*—Cooper, Dunham, Clark, Griffin & Moran

[57] ABSTRACT

A bundling process and apparatus utilizes a conveying system which is coordinated with the movement of at least one wrapping bar for successively positioning one end of a length of enwrapping material in position on one end of an intermittently operated conveyor of the conveying system. An article to be wrapped is placed over the positioned end of the enwrapping material and then carried forward to rest fully on the conveyor, whereupon the conveyor stops. While the article is on the stationary conveyor, the wrapping bar travels a path encircling the conveyor and carries the opposite end of the enwrapping material around the article, positioning it so that as the article moves onto another conveyor of the system it laps the end positioned underneath the article, and the lap is then sealed and the enwrapping material heat shrunk to form a tight sleeve wrap or bundle.

Means are provided for controlling the feed of the wrapping material from a continuous roll mounted beneath the conveying system, in the middle of the wrap bar travel path, for severing the proper length of material and for maintaining the leading end of the severed material in position on the end of the intermittent conveyor until the article is placed thereon.

22 Claims, 4 Drawing Figures

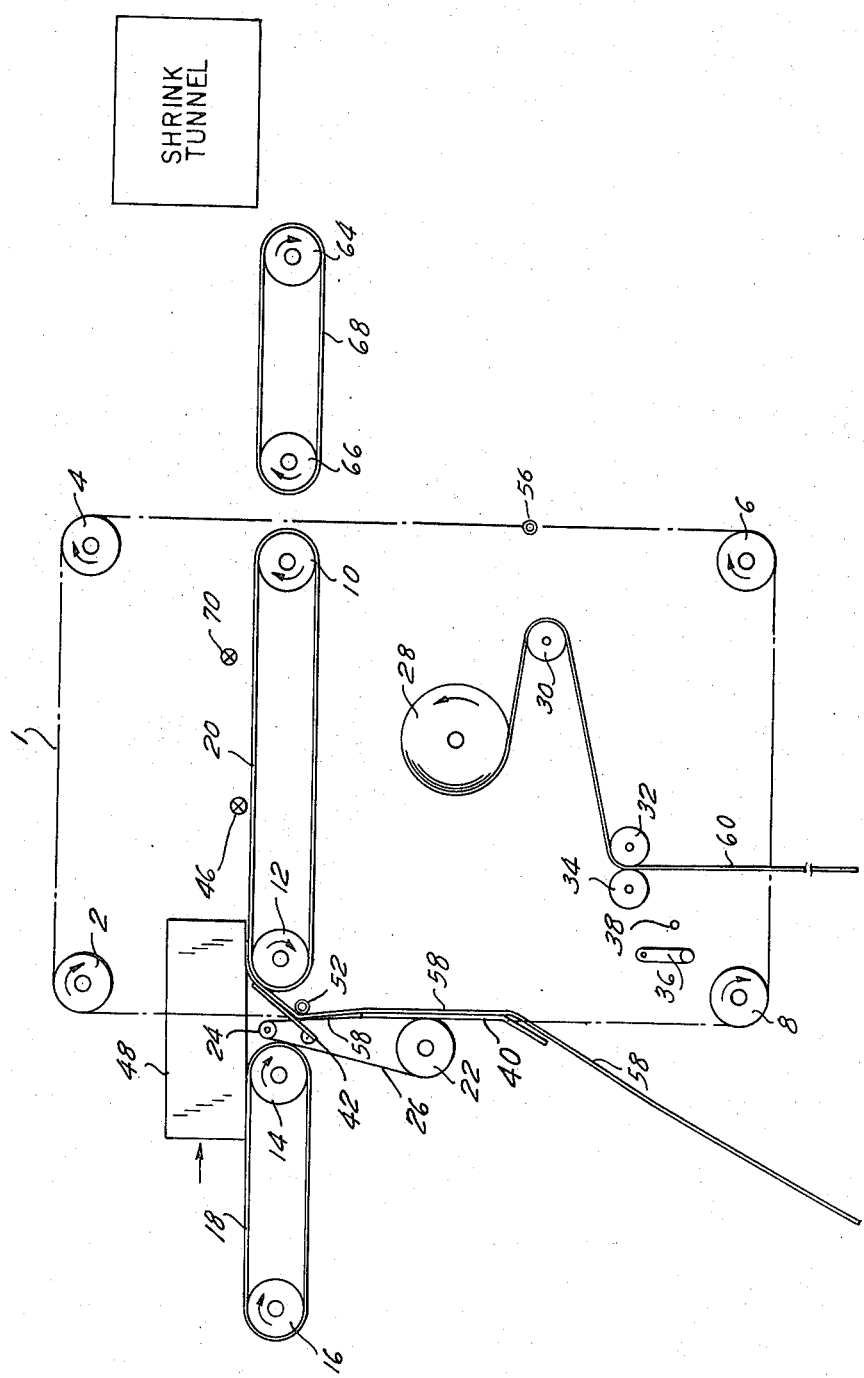

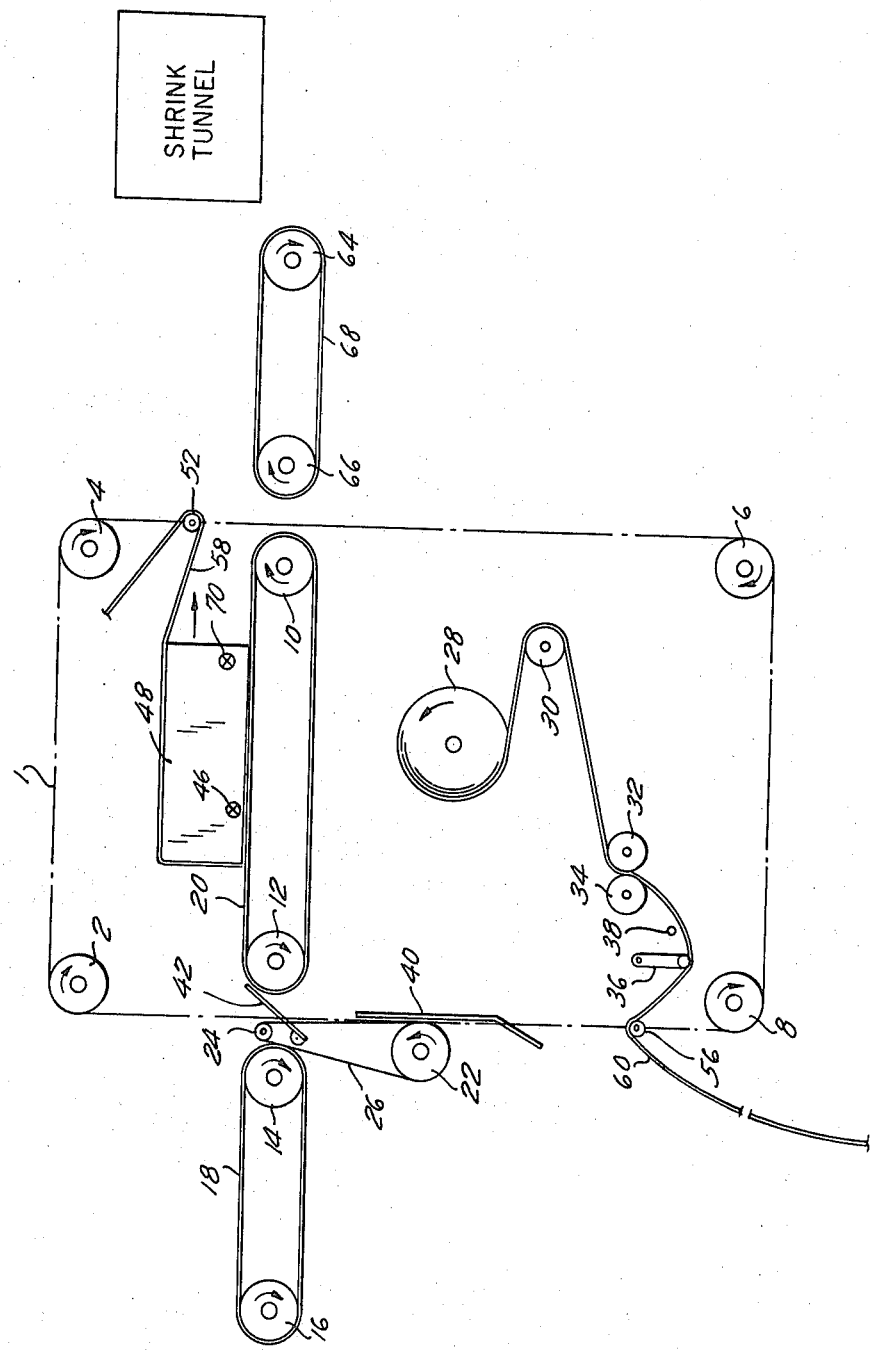

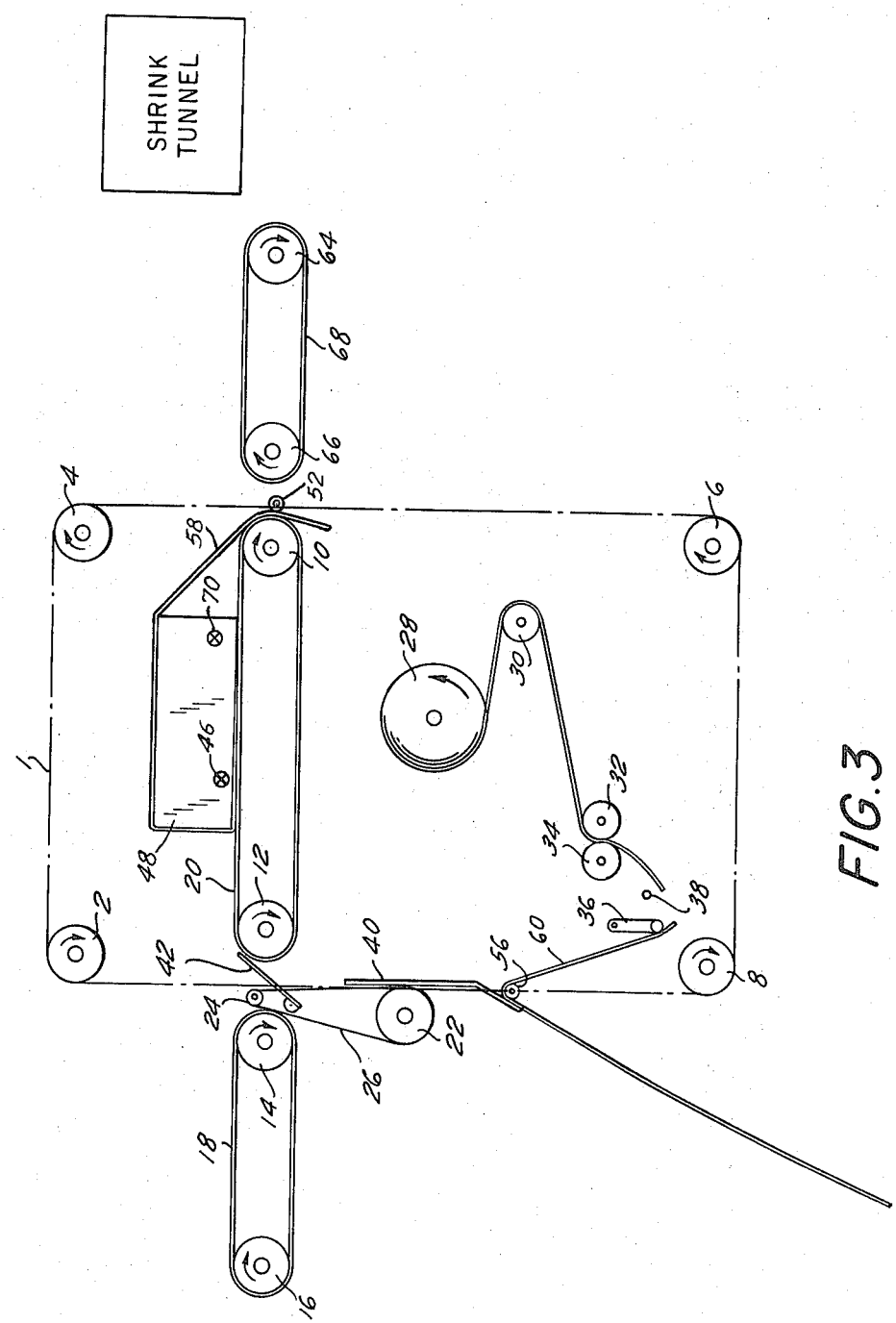

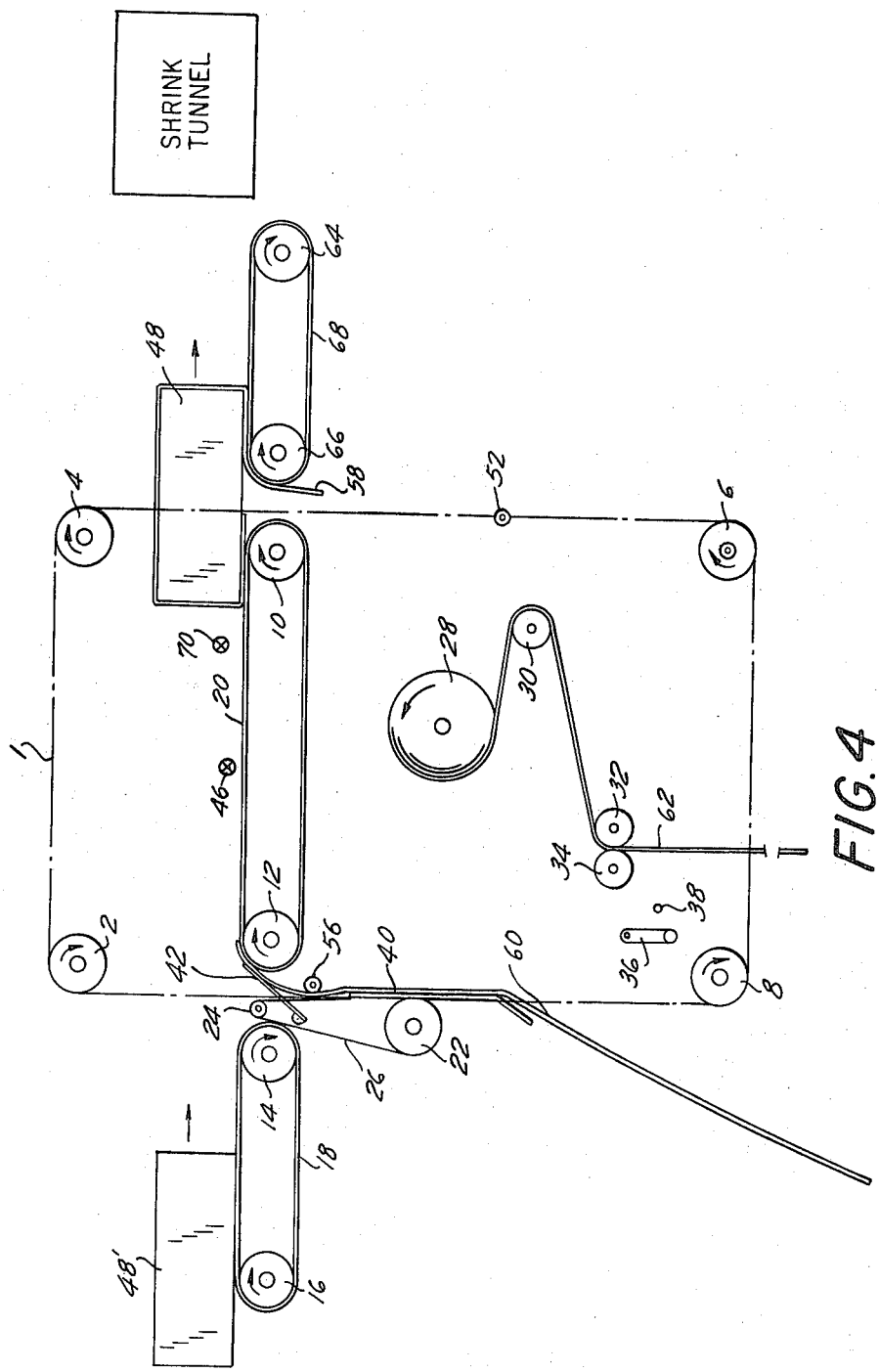

BUNDLING MACHINE AND PROCESS

An improvement of the apparatus disclosed in this application is disclosed and claimed in applicant's related application entitled Packaging Machine And Process, Ser. No. 135,644, filed Apr. 20, 1971.

BACKGROUND OF THE INVENTION

Modern merchandising techniques are now requiring more convenient packaging of articles for retail sale, particularly those items which are sold as a plurality of individual articles; machines for wrapping such articles in convenient packages or cartons and the articles so wrapped have gained a wide acceptance with retail outlets and customers.

Packages of transparent plastic film are also becoming widely accepted because of their "see-through" feature, their compactness and the ease with which the packaging materials are disposed. Thus such packages are of particular interest in combating the pollution problem.

The present invention relates to a process and apparatus for packaging articles, and particularly a plurality of similar articles, in a plastic film. The apparatus is of the type known to the art as a bundling machine.

BRIEF STATEMENT OF THE INVENTION

The novel packaging process and apparatus of this invention is directed to a wrapping concept where an article, or a plurality of articles, is conveyed on a wrapping conveyor to a wrapping zone, stops, a predimensioned strip of film is then carried completely around the article and over the output end of the wrapping conveyor, and the enwrapped article is then conveyed to a finishing zone to complete an overlapped sleeve about the article, as it is being conveyed out of the wrapping zone, and to seal the overlapped material and shrink the enwrapping material in the finishing zone to form the finished package.

Briefly, the process of the invention comprises the steps of cutting a strip of a wrapping material from a continuous roll centrally mounted within the path of a wrap bar, effectively inverting the cut strip so that its initially leading edge becomes its trailing edge, inserting the new leading edge of the cut strip onto the input end of a conveyor within the wrapping zone, placing the article to be enwrapped on the conveyor over the leading edge of the strip and advancing the article forward to be fully on the conveyor, whereupon the conveyor stops, passing the wrap bar around the conveyor to carry the trailing edge of the strip completely around the article and over the output end of the conveyor, advancing the conveyor to pass the article onto another surface so that the then leading edge of the wrapping material overlaps the trailing edge to form a complete sleeve wrap around the article, and thereafter sealing the overlapping edges and shrinking the enwrapping material in a finishing zone.

The article is conveyed to the enwrapping zone by conveying means which normally comprise an endless belt mechanism, then through the wrapping zone by an endless belt conveying means and then to and through the finishing zone by an endless belt conveying means.

Preliminary to the actual wrapping step, wrapping material from the continuous roll centrally mounted in the path of the wrap is cut to length and carried into position by the wrap bar to have its leading edge on the input end of the upper surface of the conveyor in the wrapping zone, the wrap bar being advanced by a pair of opposed endless belts or chains on driving and idler rollers.

Thus the enwrapment of the article, and the preliminary positioning of the wrapping material at the input end of the wrapping zone, are both accomplished by means of the same wrapping bar. Alternatively, however, each wrapping function and material positioning function may be accomplished by a pair of bars operating in conjunction with each other, where the first bar acts as a material positioning bar and the second acts as the wrapping bar.

The preferred enwrapping material for use with this invention is a plastic film material, although the usual wrapping paper may be used. The plastic materials of choice are those plastic materials which shrink when their temperature is elevated, thus exerting a tightening effect on the package to result in a more compact article.

Operable film materials include the following: polyolefin film such as low or medium density polyethylene film, polyester film such as polyacrylate film, polymethacrylate film, polyethylterephthalate film, and the like, cellulose film, such as regenerated cellulose (cellophane), ethyl cellulose, cellulose acetate, cellulose acetate butyrate, cellulose propionate, etc., the polyvinyl films such as polyvinyl chloride films, ionomer films, and the like. Film thickness is selected depending upon the package desired and may vary from about one-half mil to about 10 mils, with a film of from one-half to 4 mils being preferred.

Especially preferred and contemplated in the preferred embodiment is a low density polyethylene film having a thickness of 1 to 4 mils. By the term "dimensioned film" is meant a strip of film having a length sufficient to completely enwrap the article or plurality of articles being packaged with sufficient overlap to permit sealing. The width of the film is preferably selected so that there is from 1 to 4 inches overlap on the sides of the article. When subjected to a finishing step, such as the application of heat, the plastic film shrinks and the overlapping edges tightly lock the corners of the package and furnish a convenient carry handle therefor.

When using plastic film as a wrapping material the dimensioning means usually comprises a heated wire element of a length slightly greater than the width of the film such that contact with the heated wire immediately severs the film at the desired position. Other severing means can, of course, be used. As was stated above, the finishing zone normally comprises means for increasing the temperature of the plastic wrapping material to above its shrinking point, after sealing the lapped ends of the film to each other. This may be brought about by radiant heaters, flame jets, hot air jets and like means known to the art.

SPECIFIC DESCRIPTION OF THE INVENTION

The invention will be more clearly explained by reference to the drawings in which FIGS. 1–4 are schematic diagrams of the apparatus of the invention at four different sequential steps of the packaging operation. Throughout the drawings, the same reference numerals are used to indicate comparable portions of the apparatus.

Turning now to the drawings, reference numeral 1 indicates one of an opposed pair of endless belts which may be driven in any well known manner such as by rollers 2, 4, 6 and 8. Any of the rollers may be a driving roller attached to a driving shaft and a power source, not shown. Rollers 2, 4 and 8 are independently supported by support means not shown such that there is free space between the opposed pairs. Let it be understood that the terms "belts" and "rollers" as used herein shall encompass all conventional types of moving and guiding means.

It is understood, of course, that those idler rollers which do not drive are equipped with the normal positioning and tensioning devices so that the driving belts are maintained at the proper degree of tension and in the proper position.

The conveyor system of the apparatus of this invention comprises a prime conveyor driven by driving roller 10 and an idler tensioning roller 12 with a conveyor belt 20 operating thereupon. This conveyor can also be designated a wrapping conveyor since it is located within the wrapping section or zone of the apparatus, and most of the wrapping takes place while the article is located on this conveyor. An article feeding conveyor comprises driving roller 14, an idler tensioning roller 16 and an endless belt 18.

Positioned to operate in the space between driving roller 14 of the feed conveyor and idling roller 12 of the wrapping conveyor, is a film feeding conveyor comprising driving roller 22, idling roller 24 and endless belt 26, which assists in feeding the dimensioned film to the apparatus, as will be explained.

A continuous strip of film from film feed roll 28 is fed to the apparatus across film idler roller 30 by means of film feed rolls 32 and 34. A weight bar 36, adapted to pivot about the upper end thereof, is positioned to operate in conjunction with a film cut-off means 28, which is normally in the nature of a heated electrical wire.

Adapted to operate in conjunction with film feed belt 26, is a film pressure plate 40 which assists in cutting the film and advancing a dimensioned length of film to a ready position for wrapping an article, as will be explained.

Adapted to operate about a pivot point at the lower end thereof, there is provided a film guide finger 42, the upper end thereof being positioned close to the input end of conveyor belt 20 and pointed in such a direction as to guide the film into contact with the upper surface of the belt 20 at a point adjacent the idler roll 12.

A photoelectric cell 46, properly connected to the power source, is provided in the apparatus slightly above the upper stretch of the wrapper conveying system, such that the advance of a package article 48 to this photocell will actuate the film feeding conveyor 26 to advance the film with the package. Also, a second photoelectric cell 70 is provided to interrupt the rotation of conveyor belt 20 once the article reaches this photocell.

The pair of endless belts, represented in the figures by reference numeral 1, are spanned by first and second wrapping bars 52 and 56. Both of these wrapping bars are rotatably mounted on rollers. A first dimensioned film, that is, a strip of film of the proper width and cut to the proper length for the article to be enwrapped, is shown at 58 and a second film strip is designated by reference numeral 60. Reference numeral 62 in FIG. 4 designates a third strip of film.

Driving roller 64, idler roller 66 and endless belt 68 comprise a package removal system which accepts the completely enwrapped package for further processing such as sealing and heat shrinking, as will be described.

The operation of the apparatus of this invention is shown in its various stages in FIGS. 1–4 which are schematic diagrams of the sequence of operation.

In FIG. 1, endless belts 18 and 20 operate to move an article to be enwrapped into the wrapping zone of the apparatus on the wrapping conveyor 20. A predimensioned film 58, which is directed by guide finger 42 to the upper surface of endless belt 20, is preferably in position on the input end of conveyor belt 20 before the package 48 arrives. As the package arrives from belt 18, this film is caught between the undersurface of the package 48 and the endless belt 20. Moreover, as photoelectric cell 46 is blocked, by the passage of the package, it causes film feeding conveyor 26 to run at the same speed as the package, and thus rotate against the roller 52 to advance the film with the package, while the wrap bars 52 and 56 and the associated pair of endless belts 1 are stationary.

In the position shown in FIG. 2, the package 48 has reached the photoelectric cell 70, which stops the wrapping conveyor 20 and actuates driving roller 6, to advance the opposed endless belts 1 and the associated wrap bars 52 and 56 one-half revolution in a clockwise direction. The trailing end of film 58 is thus carried by wrap bar 52 up over the trailing edge of package 48, then over the top of the package, and down in front of the package and the output end of conveyor 20, as is shown in FIGS. 2 and 3. The end of film 58 which is secured beneath the surface of package 48, by the weight of the package and the friction with the upper stretch of belt 20, now becomes the trailing edge of the film as the wrapping bar 52 moves the leading edge around the periphery of package 48.

With this movement of the endless belts, the second wrap bar 56 picks up a second film strip 60 and carries the film against the weight bar 36.

As the belt drive continues its revolution around its rollers to reach the position shown in FIG. 3, with film 58 wrapped completely around package 48 by means of a first wrap bar 52, the second wrap bar 56 advances the second film 60 into contact with pressure plate 40 and, as bar 56 rotates against the film and pressure plate 40, the weight bar 36 is caused to pivot about its upper pivotal point and allow film 60 to make contact with cut-off wire 38, thus severing the film into another predetermined length.

As the endless belt 1 completes a half-revolution, it reaches the position shown in FIG. 4, wherein the relative positions of wrap bars 52 and 56 are reversed from that shown in FIG. 1. In this position a timing mechanism stops the rotation of belt 1, and the conveyor 20 is activated. Package 48 thus moves to the right, as shown in FIG. 4, the leading edge of film 58 being trapped by the weight of package 48 against the upper stretch of endless belt 68. Continued movement of package 48 thus wraps the two ends of film 58 around the package, and the now completely enwrapped package passes to means for sealing the overlap (not shown) and means for heat shrinking the enwrapping film about the package, such as the shrink tunnel shown schematically in the drawings.

The movement of the pair of opposed endless belts 1 to the position shown in FIG. 4, causes the wrap bar 56 to move the trailing end of the second film sheet 60 into the position shown, with its end resting on endless belt 20, as directed by the film guide finger 42. As the wrap bar 56 comes to rest in the position shown in FIG. 4, carrying the film sheet 60, since the leading edge of the film is in proximity to the conveyor belt 20, which is then running to advance the package 48 to the film sealing and shrink station, the leading edge of the film is effectively picked up by the running belt 20 and brought up to the upper surface of the belt, and it is there positioned to await another cycle of operation. The apparatus is now ready for entrance of thesecond article to be packaged 48', by the feed conveyor belt 18, and simultaneously, film feed rolls 32 and 34 make a predetermined number of revolutions to advance a new premeasured strip 62 into position to be picked up by the wrap bar 52.

Thus the cycle is completed and the dimensional film 60 will now be enwrapped about the second article 48' by means of film wrapping bar 56, as described above.

Since reference has been made to the leading and trailing ends of the dimensioned film, it should perhaps be explained that, as already intimated, these designations cannot be applied to the same ends of the film throughout the entire wrapping operation. Indeed, the leading end becomes the trailing end twice in this operation. Referring to FIG. 1, the leading end of the uncut film 60 is extending downwardly, waiting for the next wrap bar 56 to pick it up. When the wrap bar 56 reaches this film and advances further, it causes the film to be cut into a sheet, as shown in FIGS. 2 and 3, with the initially leading edge to the left of the wrap bar. Thereafter, as the wrap bar continues, as shown in FIG. 4, the initially leading edge becomes the trailing edge, and the initially trailing edge is advanced onto the upper surface of the input end of the wrapping conveyor 20. Moreover, as shown in FIGS. 2 and 3 in connection with film sheet 58, as the wrap bar thereafter continues along its path the film is wrapped about the package 48 and the trailing edge once more becomes the leading edge.

To summarize briefly, the instant invention relates to a novel wrapping system wherein an article in a wrapping zone is enwrapped with a length of wrapping film which is predimensioned, that is, cut to the proper length, prior to positioning the article in the wrapping zone. The film is first drawn from a supply roll, positioned within the path of travel of the wrap bar, and then carried by the wrap bar against a pressure plate so as to be tensioned against a cut-off means, such as a hot wire, and then the cut film is brought by the wrap bar into a ready position on the input end of a wrapping conveyor. A verticle film feeding belt and a film pressure plate coact to move the predimensioned film into the ready position. The wrap bar, which preferably is a roller bar, is designed to roll against the pressure plate and film feeding belt, thus maintaining positive control of the cut end of the film. Next the film is carried by the same wrap bar around a package which has been placed on its leading edge, and the package is then advanced from the wrapping conveyor to complete the sleeve wrap, and the overlapping area sealed and the film shrunk to form a tight sleeve wrap.

What is claimed is:

1. Automatic packaging apparatus comprising
   a wrapping conveyor having an input and an output end and an upper surface therebetween for supporting and conveying successive articles to be wrapped,
   package receiving means adjacent the output end of said wrapping conveyor but spaced therefrom,
   carrier means carrying at least one wrap bar along a path which encircles said wrapping conveyor to wrap wrapping material about an article on said conveyor,
   wrapper feeding means supplying a first length of a wrapping material to said wrapping conveyor and placing the leading end thereof above the upper surface of said conveyor adjacent its input end,
   said wrapper feeding means including means to suspend said first length of wrapping material across the path of said wrap bar, and means including said wrap bar to pick up the suspended length and advance it to the input end of said wrapping conveyor,
   article feeding means for passing at least a first article to be wrapped onto the input end of said wrapping conveyor and onto the leading end of the wrapping material,
   first sensing means actuated when said first article is positioned on said conveyor at a predetermined location, with at least part of said article resting on the leading end of said wrapping material, for stopping said wrapping conveyor,
   means operable when said conveyor is stopped for starting the carrier means and wrap bar into motion along said path to convey the trailing end of said first length of wrapping material up over said first article and down in front of it, adjacent the output end of said wrapping conveyor, while the leading end of the wrapping material remains restrained underneath said article,
   said wrapper feeding means being synchronized with said wrap bar for supplying a second length of wrapping material and advancing the leading end thereof to the input end of said conveyor while said wrap bar is conveying the trailing end of the first length up and over and down in front of said first article, and
   means operable after said wrapping material has been so conveyed about said first article for starting said wrapping conveyor into motion to pass said article onto said package receiving means to cause the trailing end of said wrapping material to overlap the leading end thereof, underneath the article.

2. Apparatus as in claim 1, further including means associated with the package receiving means for sealing the overlapped ends of said wrapping material.

3. Apparatus as in claim 2, wherein the wrapping material is shrinkable film, and
   further including a shrink tunnel disposed in cooperative relation to said package receiving means for shrinking the wrapping material about said article after the overlapping ends have been sealed.

4. Apparatus as in claim 1, wherein said wrapper feeding means includes means to pick up the wrapping material at a point spaced from the input end of said wrapping conveyor and to invert said wrapping material from its initial condition so that its initially trailing end becomes its leading end and is presented to the input end of said wrapping conveyor.

5. Automatic packaging apparatus comprising a wrapping conveyor having an input and an output end and an upper surface therebetween for supporting and conveying successive articles to be wrapped, package receiving means adjacent the output end of said wrapping conveyor but spaced therefrom, carrier means carrying at least one wrap bar along a path which encircles said wrapping conveyor to wrap wrapping material about an article on said conveyor, wrapper feeding means supplying a length of a wrapping material to said wrapping conveyor and placing the leading end thereof above the upper surface of said conveyor adjacent its input end, said wrapper feeding means including means for holding said wrapping material to extend across the path of the wrap bar, and means for advancing the wrap bar into the extended wrapping material to pick it up and carry it on the wrap bar as it passes along its path toward the input end of the wrapping conveyor, article feeding means for passing at least one article to be wrapped onto the input end of said wrapping conveyor and onto the leading end of the wrapping material, first sensing means actuated when said article is positioned on said conveyor at a predetermined location, with at least part of said article resting on the leading end of said wrapping material, for stopping said wrapping conveyor, means operable when said conveyor is stopped for starting the carrier means and wrap bar into motion along said path to convey the trailing end of said wrapping material up over the article and down in front of it, adjacent the output end of said wrapping conveyor, while the leading end of the wrapping material remains restrained underneath said article, and means operable after said wrapping material has been so conveyed about the article for starting said wrapping conveyor into motion to pass said article onto said package receiving means to cause the trailing end of said wrapping material to overlap the leading end thereof, underneath the article.

6. Apparatus as in claim 5, further including means providing a surface adjacent the wrap bar path near the input end of the wrapping conveyor, wherein the wrap bar is circular in cross-section and rotatable about its own axis and it presses against and rotates along said surface, with the wrapping material therebetween, to advance one end of the wrapping material toward the input end of the wrapping conveyor.

7. Apparatus as in claim 6, further including a cut-off means to cut the wrapping material into sheets, wherein the wrap bar presses the wrapping material it carries against said surface to tension said wrapping material against said cut-off means to cut off a sheet as it is being carried by the wrap bar.

8. Apparatus as in claim 6, wherein a substantial portion of the surface of said cooperating means is substantially vertical and the lower end thereof is at an angle thereto to provide a meeting surface for the wrap bar.

9. Automatic packaging apparatus comprising a wrapping conveyor having an input end and an output end and a surface therebetween for supporting successive articles to be wrapped, a package receiving means adjacent the output end of said wrapping conveyor but spaced therefrom, carrier means carrying at least one wrap bar along a path which encircles said wrapping conveyor to wrap wrapping material about an article on said conveyor, a supply of wrapping material, means for advancing a portion of said wrapping material into the path traversed by said wrap bar and maintaining it across said path, means for advancing said wrap bar along its path into said wrapping material to transport said wrapping material to a ready position at the input end of said wrapping conveyor with the leading end of said wrapping material above the upper surface of the wrapping conveyor adjacent its input end, article feeding means for passing at least one article to be wrapped onto said wrapping conveyor to rest on said conveyor, with at least part of said article resting on the leading end of said wrapping material, means for continuing the travel of said wrap bar along its path, once the article is located on said wrapping conveyor, to convey the trailing end of said wrapping material up over said article and down in front of said article, and means for forwarding said article to said package receiving means to cause the trailing end of said wrapping material to overlap the leading end thereof, underneath said article, as it moves from said wrapping conveyor to said package receiving means.

10. Apparatus as in claim 9, wherein said carrier means is an endless conveyor which carries the wrap bar and completely encircles the wrapping conveyor.

11. Apparatus as in claim 10, wherein there are two wrap bars carried by the endless conveyor at substantially diametrically opposite points thereof, wherein said wrap bars alternate in transporting lengths of wrapping material to said ready position and in conveying said lengths of wrapping material about successive articles, and wherein one such wrap bar transports a length of said wrapping material to said ready position while the other wrap bar is conveying another length of wrapping material from the ready position about an article.

12. Apparatus as in claim 9, further including wrapper advancing means independent of said wrapping conveyor, operable when an article has reached a predetermined location on said wrapping conveyor, for advancing the wrapping material with the article to cause it to advance along the wrapping conveyor with the article.

13. Apparatus as in claim 12, wherein said wrapper advancing means is a substantially vertical conveyor located adjacent the path of the wrap bar, wherein the wrapping material extends downwardly between the wrap bar and the substantially vertical conveyor when its leading end is above the wrapping conveyor at its input end, and wherein the wrapping material is advanced by actuating the substantially verticle conveyor to rotate the wrap bar and advance the wrapping material.

14. Apparatus as in claim 9, further including means providing a surface adjacent the wrap bar path near the input end of the wrapping conveyor, wherein the wrap bar is circular in cross-section and rotatable about its own axis and it presses against and rotates along said surface, with the wrapping material therebetween, to advance one end of the wrapping material toward the input end of the wrapping conveyor.

15. Apparatus as in claim 14, further including a cut-off means to cut the wrapping material into sheets, wherein the wrap bar presses the wrapping material it carries against said surface to tension said wrapping material against said cut-off means to cut off a sheet as it is being carried by the wrap bar.

16. Apparatus as in claim 9, further including sensing means actuated when an article reaches a predetermined location on said wrapping conveyor for stopping said wrapping conveyor and starting the carrier means in motion to pass the wrap bar about the article while it is stationary on the wrapping conveyor, and means for starting said wrapping conveyor into motion, to advance the article to the package receiving means, once the wrap bar has passed about the article.

17. Apparatus as in claim 16, wherein said carrier means carries two wrap bars positioned diametrically opposite to one another along said wrap bar path, and further including means to advance said wrap bars one-half revolution along said wrap bar path each time said carrier means is started into operation by said sensing means.

18. Automatic packaging apparatus comprising a wrapping conveyor having an input end and an output end and a surface therebetween for supporting successive articles to be wrapped, a package receiving means adjacent the output end of said wrapping conveyor but spaced therefrom, conveyor means carrying at least one wrap bar along a path which encircles said wrapping conveyor to wrap wrapping material about an article on said conveyor, a supply of wrapping material located under said wrapping conveyor and within the area encircled by said wrap bar, means for advancing a portion of said wrapping material to hang downwardly across the path traversed by said wrap bar, means for advancing said wrap bar along its path into said wrapping material to transport said wrapping material to a ready position at the input end of said wrapping conveyor, with the leading end of said wrapping material above the upper surface of the wrapping conveyor adjacent its input end, means for continuing the travel of said wrap bar along its path to wrap an article resting on the leading end of said wrapping material, said wrap bar conveying the trailing end of said wrapping material up over said article and down in front of said article, and means for forwarding said article to said package receiving means to cause the trailing end of said wrapping material to overlap the leading end thereof, underneath said article, as it moves from said wrapping conveyor to said package receiving means.

19. Automatic packaging apparatus comprising a wrapping conveyor having an input end and an output end for supporting and conveying successive articles to be wrapped, package receiving means adjacent the output end of said wrapping conveyor but spaced therefrom, carrier means carrying at least one wrap bar along a path which encircles said wrapping conveyor to wrap wrapping material about an article on said conveyor, wrapper feeding means supplying a length of a wrapping material to said wrapping conveyor and placing one end thereof above the upper surface of said conveyor adjacent its input end, said wrapper feeding means including means to advance a length of wrapping film from a supply roll of such film across said wrap bar path, means to cut off a predetermined length of such film to form a sheet thereof, and means including said wrap bar to pick up such sheet and invert it end-for-end to place the end thereof which has just been cut above the upper surface of the input end of the wrapping conveyor, article feeding means for passing at least one article to be wrapped onto said wrapping conveyor to rest on said conveyor with at least part of said article resting on the leading end of the sheet of wrapping material, driving means for said carrier means to move the wrap bar along said path to convey the trailing end of said wrapping material up over the article and down in front of it, adjacent the output end of said wrapping conveyor, while the leading end of the wrapping material remains restrained underneath said article, and driving means for said wrapping conveyor for advancing said conveyor to pass the article from said wrapping conveyor onto the package receiving means, after said wrapping material has been conveyed about the article, to cause the trailing end of said wrapping material to overlap the leading end thereof, underneath the article.

20. Apparatus as in claim 19, wherein the wrapping material is shrinkable film, further including means associated with the package receiving means for sealing the overlapped ends of said shrinkable film, and a shrink tunnel disposed in cooperative relation to said package receiving means for shrinking said film about said article after the overlapping ends have been sealed.

21. Automatic packaging apparatus comprising a wrapping conveyor having an input and an output end and an upper surface therebetween for supporting and conveying successive articles to be wrapped, package receiving means adjacent the output end of said wrapping conveyor but spaced therefrom, carrier means carrying at least one wrap bar along a path which encircles said wrapping conveyor to wrap wrapping material about an article on said conveyor, wrapper feeding means supplying a length of a wrapping material to waid wrapping conveyor and placing the leading end thereof above the upper surface of said conveyor adjacent its input end, with the remainder thereof extending downwardly off said wrapping conveyor and passing adjacent said wrap bar, article feeding means for passing at least one article to be wrapped onto the input end of said wrapping conveyor and onto the leading end of the wrapping material, wrapper advance means, operable after said article has reached the input end of said conveyor and passed onto the leading end of the wrapping material, for advancing said wrapping material with the article to cause it to pass along the wrapping conveyor with the article, said wrapper advance means including an endless conveyor surface on the opposite side of said downwardly extending wrapping material from said wrap bar, which rotates against the wrap bar, with the wrapping material located therebetween, to advance said wrapping material with the article, means for advancing the carrier means to advance the wrap bar along its path and convey the trailing end of said wrapping material up over the article, once the article has passed fully onto said wrapping conveyor, and, then down in front of the article, adjacent the output end of said wrapping conveyor, while the leading end of the wrapping material remains restrained underneath said article, and means operable after said wrapping material has been so conveyed about the article for forwarding said article onto said package receiving means to cause the trailing end of said wrapping material to overlap the leading end thereof, underneath the article.

22. Apparatus as in claim 21, wherein the wrap bar is circular in cross-section and rotatable about its own axis.

* * * * *